Oct. 3, 1933.  G. INGLE  1,929,024

CAR SEAT AND BACK

Filed Sept. 26, 1932 2 Sheets-Sheet 1

INVENTOR,
George Ingle.
BY
E. E. Vrooman & Co.,
ATTORNEYS.

Oct. 3, 1933.  G. INGLE  1,929,024
CAR SEAT AND BACK
Filed Sept. 26, 1932  2 Sheets-Sheet 2
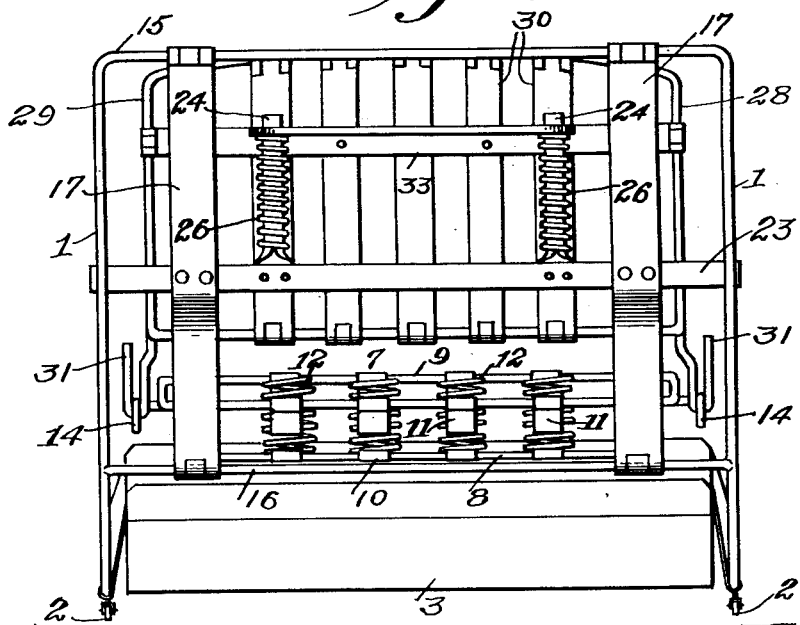
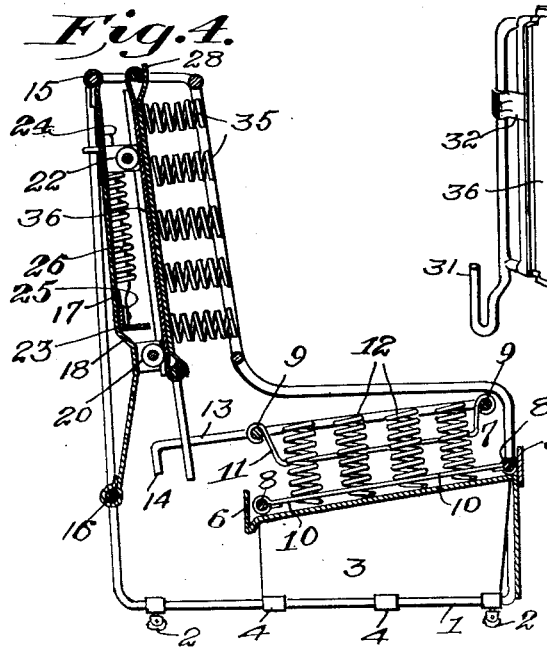
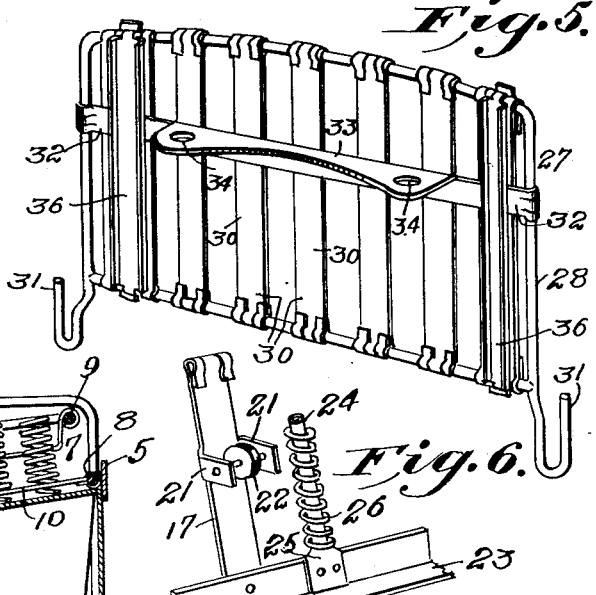
INVENTOR.
George Ingle,
BY
His ATTORNEYS.

Patented Oct. 3, 1933

1,929,024

UNITED STATES PATENT OFFICE 1,929,024

CAR SEAT AND BACK

George Ingle, New Tazewell, Tenn., assignor of one-half to John Ingle, Kildav, Ky.

Application September 26, 1932
Serial No. 634,959

4 Claims. (Cl. 155—53)

This invention relates to a car seat and back.

An object of my invention is the construction of a simple and efficient car seat and back, which can be used in any desired place, but preferably, in a motor vehicle.

Another object of my invention is the improvement of the construction of not only the seat portion of an apparatus of this description, but particularly the back structure thereof, in which I employ a novel and efficient movable section that makes an admirable support or rest for the user's back.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a view in front elevation of an apparatus constructed in accordance with the present invention, while

Figure 3 is a view in rear elevation of the apparatus.

Figure 4 is a sectional view taken on line 4—4, Figure 2, and looking in the direction of the arrows.

Figure 5 is a perspective view of the movable section of the back.

Figure 6 is a fragmentary perspective view of the back.

Figure 1:
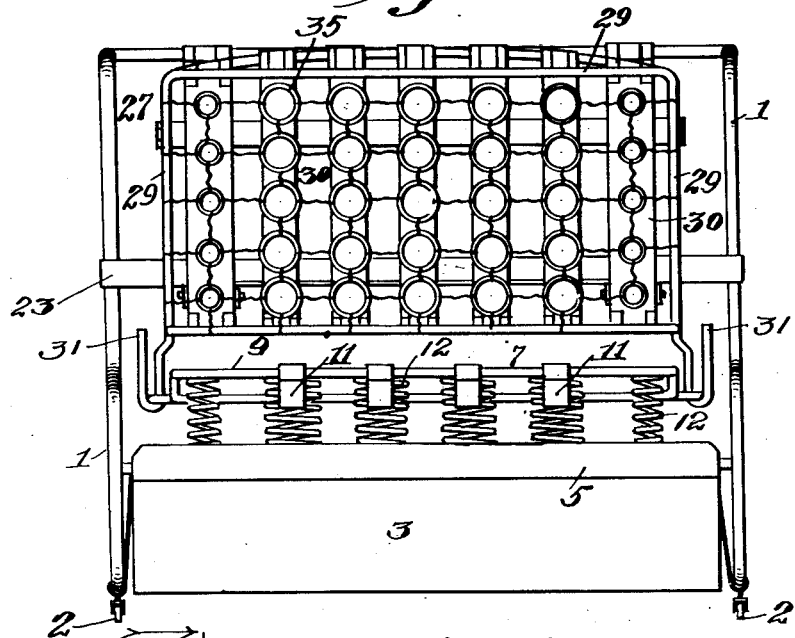
Figure 2:
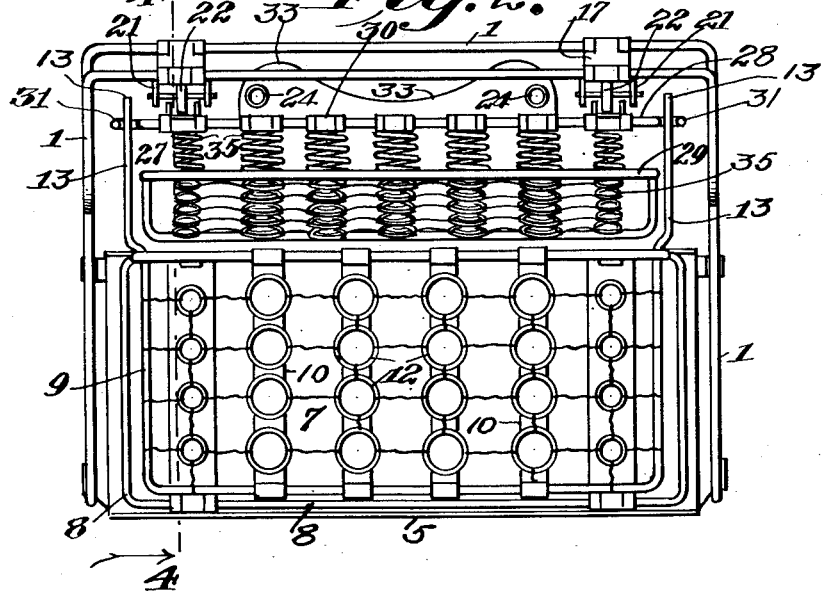
Figure 2 is a top plan view of the same.

Referring to the drawings by numerals, 1 designates the main frame of the apparatus to which is suitably attached caster 2 so that the apparatus may be easily moved, if the operator so desires. The seat base 3 is fastened by strips 4 (Fig. 4) to the frame 1; this seat base is provided with a front upstanding flange 5 and a rear upstanding flange 6 between which is positioned the removable seat section 7.

The seat section 7 comprises a bottom frame 8 and a top frame 9. The bottom frame 8 has a plurality of parallel brackets 10; each bracket 10 is fastened at its ends to the frame 8. The top frame 9 has a plurality of brackets 11 that are bent upwardly at their ends and crimped or folded over the frame 9 (Fig. 4). Vertical coil springs 12 are carried by said brackets 10 and 11. The upper frame 9 has a pair of rearwardly extending arms 13, each arm being bent downwardly at 14. Both the seat section and the back section of the apparatus are suitably upholstered (not shown). It is to be noted that the lower end of each spring 12 engages a lower bracket 10 while an upper bracket 11 enters a portion of the spring between its ends as indicated in Figs. 3 and 4. By this construction, the springs are primarily held in accurate position, irrespective of the upholstering and give a very satisfactory result.

The back section of the apparatus comprises a top bar 15 fastened to the frame and a bottom bar 16 fastened to the frame (Fig. 4). Two vertical uprights 17 are each provided at its ends with split portions which are folded or crimped around the top bar 15 and the lower bar 16 as clearly seen in Figs. 3 and 4. Each upright 17 is bent inwardly at 18 (Fig. 6) at which portion is formed a pair of brackets 19, upon which is mounted a roller 20. Near the upper end of each upright 17 is a pair of parallel brackets 21 upon which is mounted a roller 22. Fastened to the uprights 17 at their inwardly bent portions 18 is a horizontal angle bar 23. The rollers 20 of the two brackets clear the lower portion of the angle bar for the purpose hereinafter described. A pair of vertical posts 24 is provided, each being flattened at 25, and this flattened portion is riveted to the angle bar 23. On each post is mounted a coil spring 26.

The movable section 27 of the back structure of the apparatus is particularly seen in Figure 5. This section 27 comprises an inner frame 28 and an outer frame 29. A plurality of vertical brackets 30 are provided, each having split ends folded or crimped around the frame 28 as clearly seen in Figure 5. The frame 28 is provided at its lower corners with substantially U-shaped vertical guides 31 in which is normally positioned the arms 13 of the seat section 7. A horizontal brace 32 is fastened at its ends to the vertical parts of frame 28 (Fig. 5), and this brace is provided with a horizontal flange 33. Flange 33 is provided with vertical apertures 34 in which work the upper ends of posts 24. Coil springs 35 are fastened at their inner ends to the vertical slats or brackets 30 and are covered by the upholstery (not shown) when the entire seat is finished. A pair of grooved vertically-positioned tracks 36 is fastened to the frame 28 and in these tracks are positioned rollers 20 and 22. By bending the uprights 17 inwardly at 18, the tracks 36 when resting upon the rollers clear the angle bar 23 whereby the movable back section 27 can have a sufficient bodily movement in a vertical plane for allowing a satisfactory "give" to the back of the user of the finished seat. When downward pressure is placed upon the movable section 27, the coil springs 26 will be compressed upon the posts 24, and as soon as the pressure is removed the springs will return the section to its normal position within the upholstery. The springs 35 give the desired yielding result that is most satisfactory to the user whose back is resting against the same. This has been determined by operating a model constructed in accordance with the present invention.

The arms 13 positioned in the guides 31 tend to hold the movable seat section and the movable back section in satisfactory position upon the main frame.

The movable section of the back, slidably mounted on the posts 24 can not be displaced off the frame since the post acts as an anchor, especially is this so prior to the upholstery being attached.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In an apparatus of the class described, the combination of a main frame, uprights carried by said frame, a bar attached to said uprights, vertical posts attached to said bar, coil springs on said posts, and a movable back section slidably mounted on said posts against said coil springs.

2. In an apparatus of the class described, the combination of a main frame provided with an upper and a lower bar, a pair of uprights provided with split ends crimped around said bars, each upright provided with pairs of brackets, rollers mounted on said brackets, a horizontal bar fastened to said uprights, posts carried by said horizontal bar, springs on said posts, a movable back section provided with grooved tracks, said rollers positioned in said tracks, and said movable back section mounted upon said posts against said springs, and a seat section on said main frame.

3. In an apparatus of the class described, the combination of a main frame, a pair of vertical uprights carried by said frame, each upright being bent inwardly near its middle, a bar fastened to said uprights against said bent-in portions, a pair of vertical posts flattened at their lower ends and fastened against said bar, coil springs on said posts, a movable back section provided with a horizontal brace, a flange extending from said brace and provided with apertures, said posts in said apertures, and a seat section carried by said main frame.

4. In an apparatus of the class described, the combination of a main frame provided with an upper and a lower bar, a pair of uprights having their ends fastened to said bars, each upright being bent inwardly near its middle, an angle bar secured to said uprights above said inwardly bent portions, posts flattened at their lower ends and attached to said angle bar between said uprights, each upright provided with a pair of brackets above said angle bar and a pair of brackets at its inwardly bent portion near said angle bar, rollers journalled upon each pair of brackets, a back section provided with vertical grooved tracks secured to its back, said rollers travelling in said tracks with the track clear of said angle bar, a seat section on said main frame, and said back section slidably mounted on said posts.

GEORGE INGLE.